United States Patent
Fetescu

(10) Patent No.: US 6,240,718 B1
(45) Date of Patent: Jun. 5, 2001

(54) COMBINATION POWER STATION WITH POWER/HEAT COGENERATION

(75) Inventor: Mircea Fetescu, Ennetbaden (CH)

(73) Assignee: ABB Alstom Power Ltd., Baden (CH)

( * ) Notice: Subject to any disclaimer, the term of this patent is extended or adjusted under 35 U.S.C. 154(b) by 0 days.

(21) Appl. No.: 09/053,783

(22) Filed: Apr. 2, 1998

(30) Foreign Application Priority Data

May 17, 1997 (DE) .............................. 197 20 881

(51) Int. Cl.[7] ..................................... F02C 6/18
(52) U.S. Cl. .................. 60/39.07; 60/39.182; 237/12.1
(58) Field of Search .............. 60/39.07, 39.33, 60/39.182; 237/121

(56) References Cited

U.S. PATENT DOCUMENTS

| 4,043,130 | 8/1977 | Brown et al. |
|---|---|---|
| 5,727,377 | * 3/1998 | Fetescu et al. ............. 60/39.07 |
| 5,799,481 | * 9/1998 | Fetescu .................. 60/39.07 |
| 6,000,213 | * 12/1999 | Ohmoto et al. ............ 60/39.182 |

FOREIGN PATENT DOCUMENTS

| 25 12 774 | 9/1976 | (DE) . |
|---|---|---|
| 2512774C2 | 9/1976 | (DE) . |
| 0 098 481 | 1/1984 | (EP) . |
| 1 312 607 | 4/1973 | (GB) . |
| 1 342 777 | 1/1974 | (GB) . |

OTHER PUBLICATIONS

"Das kombinierte Gas–/Dampfturbinen–Heizraftwerk Utrecht", Gubser, Brown Boveri Mitt. 10–78, pp. 687–690.

* cited by examiner

*Primary Examiner*—Charles G. Freay
(74) *Attorney, Agent, or Firm*—Burns, Doane, Swecker & Mathis, L.L.P.

(57) ABSTRACT

A combination power station with power/heat cogeneration. The combination power station includes at least one gas turbine driven by combustion gases from a combustion chamber and at least one steam turbine working in a water/steam circuit. The water/steam circuit converts water into steam in a first apparatus by hot combustion gases emerging from the at least one gas turbine. The steam is supplied to the at least one steam turbine. A separate heat transfer medium is arranged in a heat exchange relationship with a heat consumer and is heated in a second apparatus by thermal energy extracted from the water/steam circuit at a plurality of extraction points each having a different temperature. The combination power station includes means for selectively connecting the second apparatus to the plurality of extraction points depending upon a thermal output and an inlet temperature required by the heat consumer.

10 Claims, 5 Drawing Sheets

COMBINATION POWER STATION WITH POWER/HEAT COGENERATION

This application claims priority under 35 U.S.C. §§119 and/or 365 to No. 197 20 881.9 filed in Germany on May 17, 1997; the entire content of which is hereby incorporated by reference.

BACKGROUND OF THE INVENTION

1. Field of the Invention

The present invention relates to the field of power station technology. It refers to a combination power station with power/heat cogeneration, having at least one gas turbine driven by the combustion gases from a combustion chamber and at least one steam turbine working in a water/steam circuit, within the water/steam circuit the water being converted into steam in a first apparatus by means of the hot combustion gases emerging from the at least one gas turbine and the generated steam being supplied to the at least one steam turbine, and a separate heat transfer medium, which is in exchange with a heat consumer, being charged in a second apparatus with thermal energy which is extracted from the water/steam circuit at a plurality of extraction points located at a different thermal level.

Such a combination power station is known, for example, from DE-C2-25 12 774.

2. Discussion of Background

In the case of combination power stations with power/heat cogeneration, the thermal energy always has to be provided in the form required at the respective point in time, that is to say as thermal output for current generation in the generator and as heat-charged heat transfer medium for the external heat consumer or heat consumers. Both the energy demand for current generation and the energy demand for the external heat consumer or heat consumers therefore fluctuate between various extreme values. In particular, according to FIG. 1 in the graph of the temperature (of the heat transfer medium) against the thermal output Pth, the thermal energy required by the external heat consumer fluctuates within a working range (represented by hatching and delimited by the corner points a–d) between a minimum inlet temperature VTmin and a maximum inlet temperature VTmax and between a minimum thermal output Pthmin and a maximum output Pthmax.

The thermal energy (heat) required for the heat consumer is transmitted from the water/steam circuit to the heat transfer medium (water or thermal oil) or to the heat consumer by means of direct or indirect heat transmission processes (by direct contact, for example by mixing, or indirectly, for example via heat exchangers). In order to obtain a working range lying between two extreme values, in this case the thermal energy is extracted from the circuit at a plurality of different thermal levels and is correspondingly transmitted to the heat transfer medium at different thermal levels by means of associated heat exhangers, usually condensers. A maximum number of extraction levels or extraction points results in a minimum loss of energy and maximum thermal efficiency. In the combination power station known from the publication initially mentioned, steam is extracted from the water/steam circuit at various points upstream and downstream of the steam turbine and is supplied in a plurality of individual heat exchangers (heating water heaters) which are connected in series with respect to the flow of the heat transfer medium and heat the heat transfer medium in succession. In this case, the last heat exchanger in the direction of flow is charged directly with fresh steam via a reducing station.

A disadvantage, here, is that, with an increasing number of extraction points and extraction levels, the number of corresponding plant components, such as heat exchangers, lines, control devices and the like, also increases and entails high capital costs as well as operating and maintenance costs. Furthermore, the extreme values of the power demand of the heat consumer, that is to say, for example, the maximum thermal output Pthmax at the maximum inlet temperature VTmax (point c in FIG. 1), do not occur very often or are usually only of short duration, so that the plant components necessary for this purpose are utilized to only a very low degree.

SUMMARY OF THE INVENTION

The object of the invention is, therefore, to provide a combination power station with power/heat cogeneration, in which heat transmission from the water/steam circuit to the heat transfer medium is drastically simplified by reducing the number of plant components, without any restriction in the number of extraction points and extraction levels.

In a combination power station of the type initially mentioned, the object is achieved in that the second apparatus can be connected selectively to the plurality of extraction points according to the thermal output and inlet temperature required by the heat consumer. The essence of the invention is not to assign each extraction point or each extraction level its own heat transmission arrangement, but to use a single heat transmission arrangement which is connected, as required, to the various extraction points or extraction levels in the water/steam circuit.

A first preferred embodiment of the combination power station according to the invention is distinguished in that individual lines equipped with controllable valves are provided for selectively connecting the second apparatus to the extraction points, said lines connecting the extraction points to the second apparatus, in that a valve control is provided for controlling the controllable valves, in that a temperature measuring point is arranged at the outlet of the second apparatus in order to determine the temperature of the heat transfer medium, and in that a first input of the valve control is connected to the outlet of the temperature measuring point. This design results in a very simple, reliable and efficient control and regulation of the thermal output which is transmitted from the water/steam circuit to the heat transfer medium.

A second preferred embodiment of the combination power station is defined in that the second apparatus comprises a condenser, in that steam is extracted from the water/steam circuit by means of the extraction points and in that condensate emerging from the condenser is recirculated into the water/steam circuit, in that a first extraction point for the extraction of high pressure fresh steam, a second extraction point for the extraction of high pressure steam and a third extraction point for low pressure steam are provided, and in that the valve assigned to the first extraction point is designed as a pressure reducing valve. A wide working range for the transfer of heat to the heat consumer can be implemented by the simplest means due to this selection of extraction points and extraction levels.

Further embodiments emerge from the dependent claims.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENTS

Figure 3:
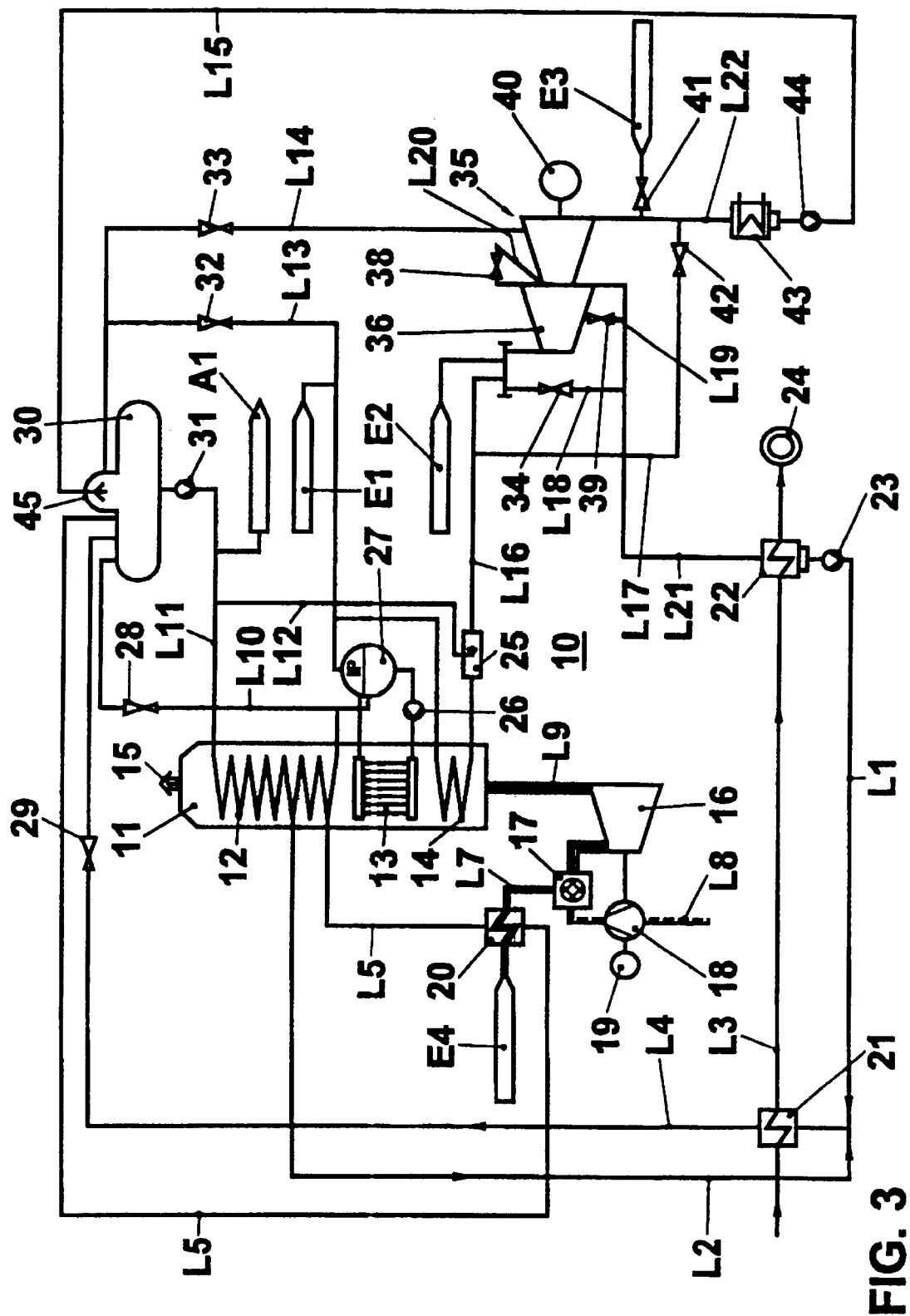
FIG. 3 shows the plan of a combination power station according to a preferred exemplary embodiment of the invention.

Referring now to the drawings, wherein like reference numerals designate identical or corresponding parts throughout the several views, FIG. 3 illustrates the plan of a combination power station according to a preferred exemplary embodiment of the invention. The combination power station 10 comprises a gas turbine 16 and a steam turbine 35 with two stages 36 and 37. The gas turbine 16 drives a first generator 19 and the steam turbine 35 a second generator 40. The gas turbine 16 works by means of the hot combustion gases from a combustion chamber 17, to which, on the one hand, combustion air compressed by means of a compressor 18 arranged on the turbine axis is supplied via the line L8 and, on the other hand, fuel is supplied via the line L7 from an inlet E4. The fuel preferably flows through a preheater 20, where it is preheated by heat exchange with heated water which flows through the line L5. The hot combustion gases from the combustion chamber 17, after they have performed work in the gas turbine 16, are conveyed via the line L9 from the outlet of the gas turbine 16 through a waste heat steam generator 11, where they heat the water of the water/steam circuit for the steam turbine 35 and convert it into highly pressurized steam. They then emerge at a flue gas outlet 15 and are discharged into the environment.

The waste heat steam generator 11 has an internal design, known per se, which comprises an economizer 12, an evaporator 13 and a superheater 14. The feedwater delivered from a feedwater tank 30 via the line L11 by a feedwater pump 31 is preheated in the economizer 12. The preheated feedwater passes from the outlet of the economizer 12, on the one hand, into a steam drum 27 and, on the other hand, via the line L5 to the fuel preheater 20 and from there back into the feedwater tank 30. The feedwater is pumped out of the steam drum 27 (which may even be omitted in other embodiments of the "once through" type), in which the liquid and vaporous phases coexist, by means of a circulating pump 26 through the evaporator 13, where it evaporates. The generated steam flows via the steam drum 27 to the superheater 14, where it is superheated and is conducted as fresh steam through the line L16 and a fresh steam cooler 25 (inoperative when the plant is operating normally), which is supplied with feedwater via the line L12, to the steam turbine 35. After the fresh steam has performed work in the two stages 36 and 37 of the steam turbine 35, it flows through the line L22 into a condenser 43 and is converted there into condensate which flows by means of a condensate pump 44 through the line L15 via a feedwater preheater/deaerator 45 back into the feedwater tank 30. The water/steam circuit belonging to the steam turbine 35 is thereby closed.

For better control of the water/steam circuit, a bypass and various taps are additionally provided in the circuit: a first tap is formed by the line L10 which leads from the outlet of the economizer 12 via a (controllable) pressure reducing valve 28 to the feedwater tank 30. A second tap is formed by the line L13 which leads from the steam outlet of the steam drum 27 via a (controllable) pressure reducing valve 32 to the feedwater preheater/deaerator 45 and which serves for extracting steam from the steam drum 27. A third tap is formed by the line L14 having the (controllable) pressure reducing valve 33, said line leading from the second stage 37 of the steam turbine 35 likewise to the feedwater preheater/deaerator 45 and serving for heating the feedwater preheater/deaerator 45. The bypass is obtained by means of the line L17 having the (controllable) pressure reducer 42 which simultaneously reduces the pressure and decreases the superheating of the steam. By means of this bypass, fresh steam can be conducted past the steam turbine 35 directly to the condenser 43 in the startup or shutdown phase of the plant.

Figure 2:
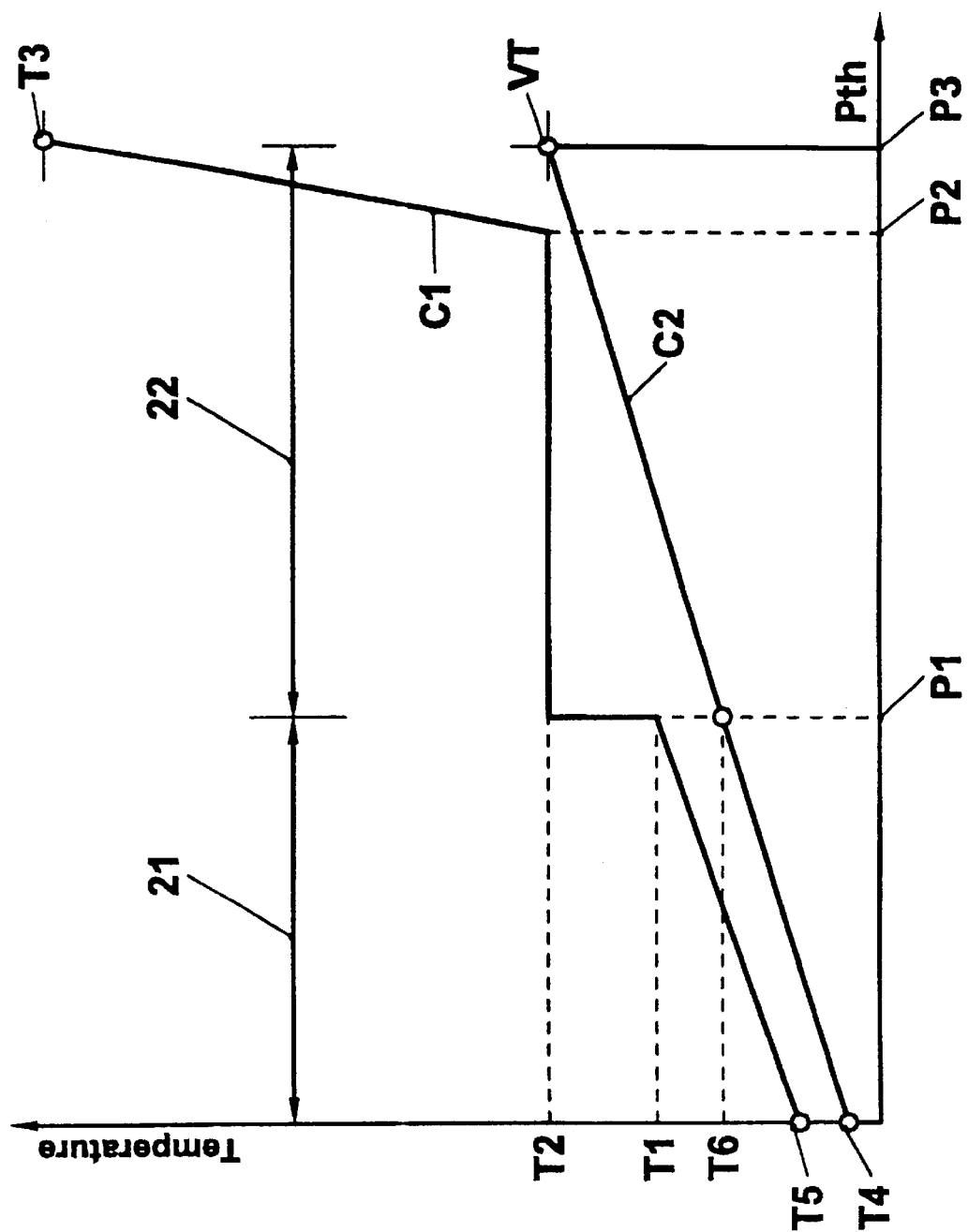
FIG. 2 shows, in a graph identical to that of FIG. 1, the transmission principle for the transmission of heat from the water/steam circuit to the heat transfer medium, as taken as a basis for the invention.

The heat transfer medium (usually water) provided for the transfer of heat to a heat consumer 24 flows through the line L3. The heat transmission, necessary for heating the heat transfer medium, between the water/steam circuit of the steam turbine 35 and the heat transfer medium in the line L3 takes place in two heat transmission arrangements 21 and 22 connected in series. The corresponding curves are reproduced in principle in the temperature/output graph of FIG. 2. The heat transmission arrangement 22 is a condenser which at the same time eliminates superheating ("desuperheater"). Superheated steam with the outlet temperature T3 and the thermal output P3 is conducted through the condenser 22 and is extracted, as required, from the water/steam circuit of the steam turbine 35 at various extraction points or thermal extraction levels. The steam first cools from T3 to T2 in the condenser 22 according to curve C1 from FIG. 2 ("desuperheating"), condenses at the constant temperature T2 and at the same time discharges the heat to the heat transfer medium which is heated from the temperature T6 to an inlet temperature VT somewhat above T2 according to curve C2 from FIG. 2. The condensate has then discharged the thermal output P3-P1 at the outlet of the condenser 22.

The condensate from the condenser 22 is transported (FIG. 3) by means of a condensate pump 23 via the line L1 to the heat transmission arrangement 21 which acts as a preheater for the heat transfer medium. At the inlet of the preheater 21, the condensate from the line L1 is mixed with colder feedwater which is delivered via the line L2 from a tap at the economizer 12. The temperature decreases from T2 to T1 (vertical segment of curve C1 in FIG. 2) as a result of the mixing operation. The mixing water flows through the preheater 21, cools from T1 to T5, at the same time discharging heat to the heat transfer medium, and returns via the line L4 and the pressure reducing valve 29 to the feedwater tank 30. The heat transfer medium heats up in counteraction from the temperature T4 to the temperature T6 (curve C2 in FIG. 2). The curves C1 and C2 in FIG. 2 stand for an individual point in the working range of the apparatus, at which the heat consumer requires only a specific thermal output and inlet temperature of the heat transfer medium. When other thermal outputs and inlet temperatures are required, other curves C1 and C2 are obtained correspondingly in the graph of FIG. 2 (see curves C3, . . . , C7 and C3', . . . , C7' in FIG. 5: in this case, the curves C6, C7 and C6', C7' stand for the heat transfer medium to be heated and therefore correspond to the curve C2 in FIG. 2; in this case, the curves C3, C4 and C3', C4' and C5' stand for the medium to be cooled, namely the extracted steam, and therefore correspond to the curve C1 in FIG. 2. For heating along curve C6, cooling takes place along curve C3; other pairs of associated curves are C7–C4, C6'–C3' and C7'–C5'; a heating curve associated with the cooling curve C4' is not shown in FIG. 5).

A change of the operating point in the T, Pth graph is taken into account, according to the invention, in that the same condenser 22 extracts the steam or heat from another extraction point in the water/steam circuit and therefore at another thermal level. For this purpose, in the exemplary embodiment of FIG. 3, the steam-side inlet of the condenser 22 can be connected selectively, via various lines L18, L19 and L20 and corresponding controllable valves 34, 39, 38, to an extraction point on the fresh-steam line L16 (steam temperature T8), an extraction point in the middle of the first stage 36 of the steam turbine 35 (steam temperature T7) and to the outlet of the first stage 36 (steam temperature T6). If the pressure reducing valve 34 is opened, fresh steam flows via the lines L18 and L21 to the condenser 22 and from there, as condensate, to the preheater 21. At the maximum opening of the pressure reducing valve 34, curve C3' in FIG. 5 corresponds to curve C1 in FIG. 2. The heat transfer medium can then be heated, according to curve C6', from the temperature T4, at which it returns from the heat consumer 24, to the maximum inlet temperature VTmax and can transmit the maximum thermal output Pthmax, whilst the fresh steam cools from the temperature T8 to the condensate temperature T5. If a lower thermal output is required in the case of a constant inlet temperature (VTmax), the pressure reducing valve 34 is throttled until (in the lower limit case) curves C3 and C6 are passed through, and, at the inlet temperature VTmax, the heat transfer medium transmits only the minimum thermal output Pthmin. For intermediate outputs, the pressure reducing valve 34 assumes an intermediate position.

If the heat transfer medium is to have an inlet temperature which is in the middle between the extremes VTmax and VTmin, the valve 39 is opened and high pressure steam is extracted from the first stage 36 of the steam turbine 35 via the lines L19 and L21 and conducted to the condenser 22. Then, depending on the opening of the valve 39, the steam cools from the temperature T7 to the temperature T5 along curves C4 and C4' or intermediate similar curves, whilst the heat transfer medium heats up to an inlet temperature located between VTmin and VTmax and transports a thermal output located between Pthmin and Pthmax.

If the heat transfer medium is to be heated from T4 merely to the minimum inlet temperature VTmin, this takes place along curve C7', in the case of maximum output Pthmax (valve 38 fully open) and along curve C7, in the case of minimum output Pthmin (valve 38 fully throttled). The low pressure steam necessary for this purpose is extracted at the outlet of the first stage 36 of the steam turbine 35 via the lines L20 and L21 by opening the valve 38 and is cooled from the temperature T6 to the temperature T4 in the condenser 22 and the following preheater according to curves C5' and C5. For outputs between the extremes, the valve 38 is in a corresponding intermediate position.

Figure 1:
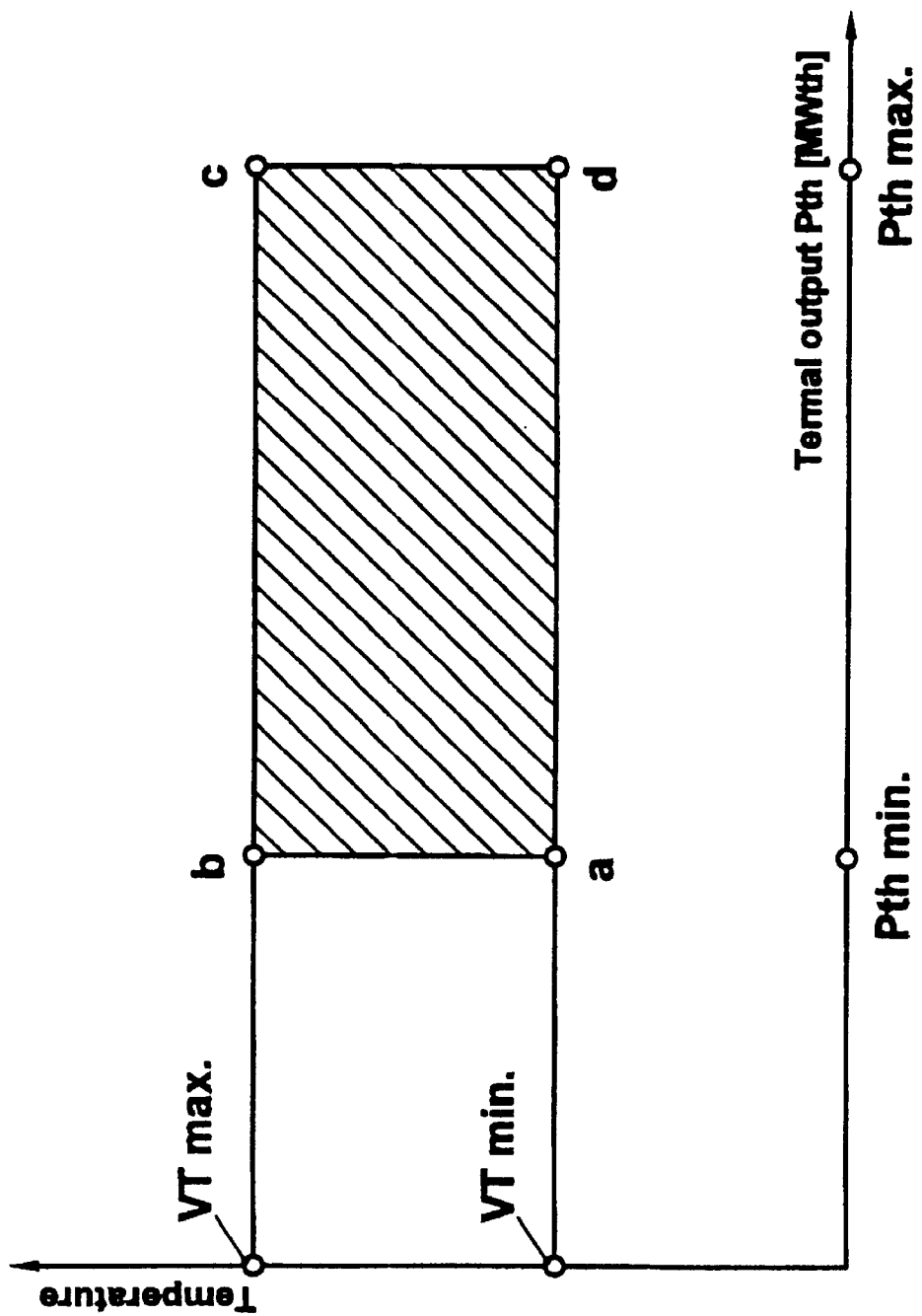
FIG. 1 shows an illustrative working range for the thermal power consumption of a heat consumer in a graph of temperature against thermal output.
Figure 5:
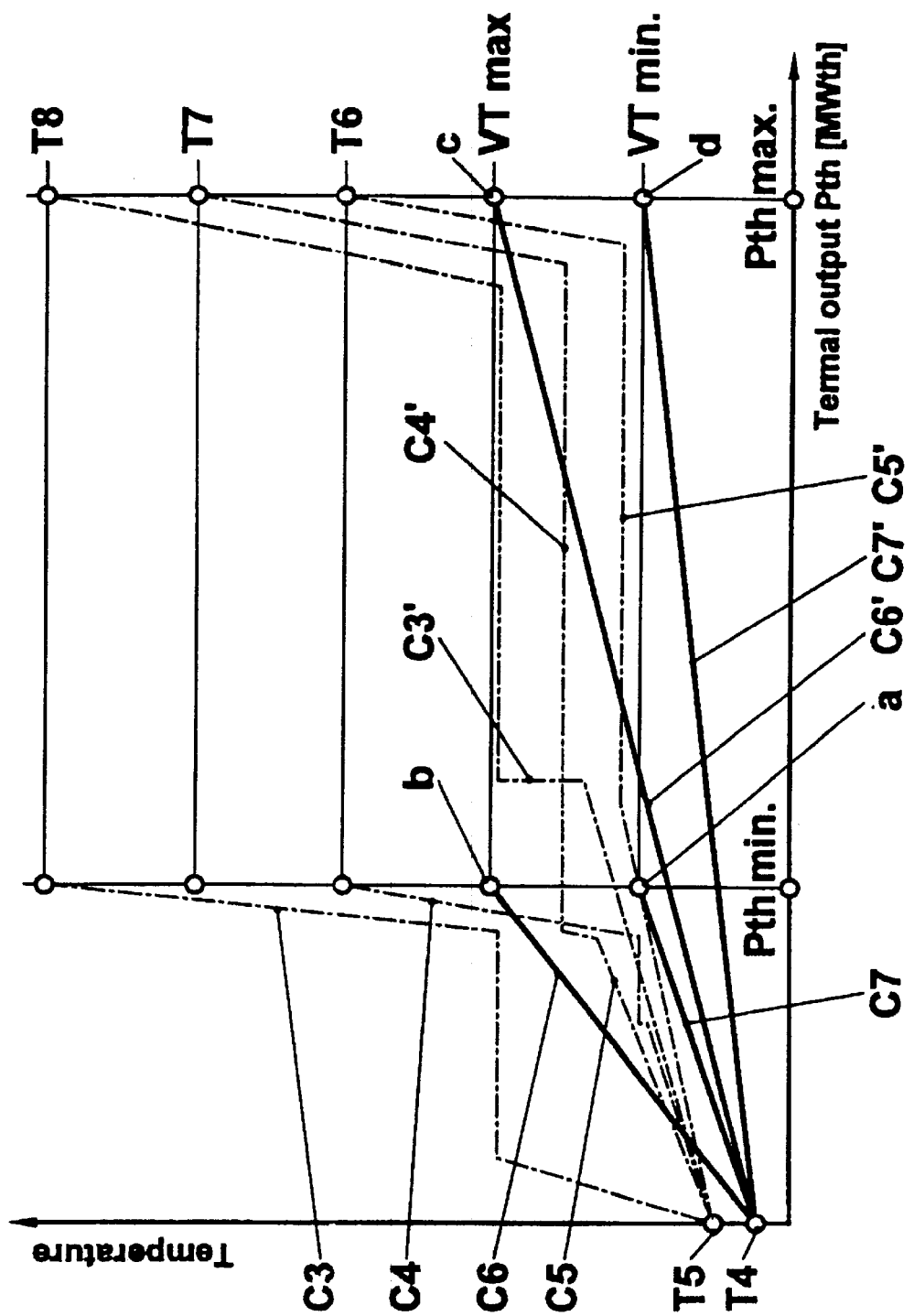
FIG. 5 shows, in a graph identical to that of FIG. 2, the transmission of thermal energy by means of three extraction points or extraction levels, as is employed in the preferred exemplary embodiment according to FIGS. 3 and 4.

The curves C6, C7 and C6', C7' in FIG. 5 mark the corner points (a–d) of the working range for heat transmission, as illustrated diagrammatically in FIG. 1. Other values of the working range may be accessed very simply by opening one or more of the valves 34, 38, 39 to a greater or lesser extent.

In particular, by a suitable choice of the valves and their position, maximum thermal efficiency can be achieved for heat transmission at any point in the working range at a minimum outlay in terms of apparatus and control.

Figure 4:
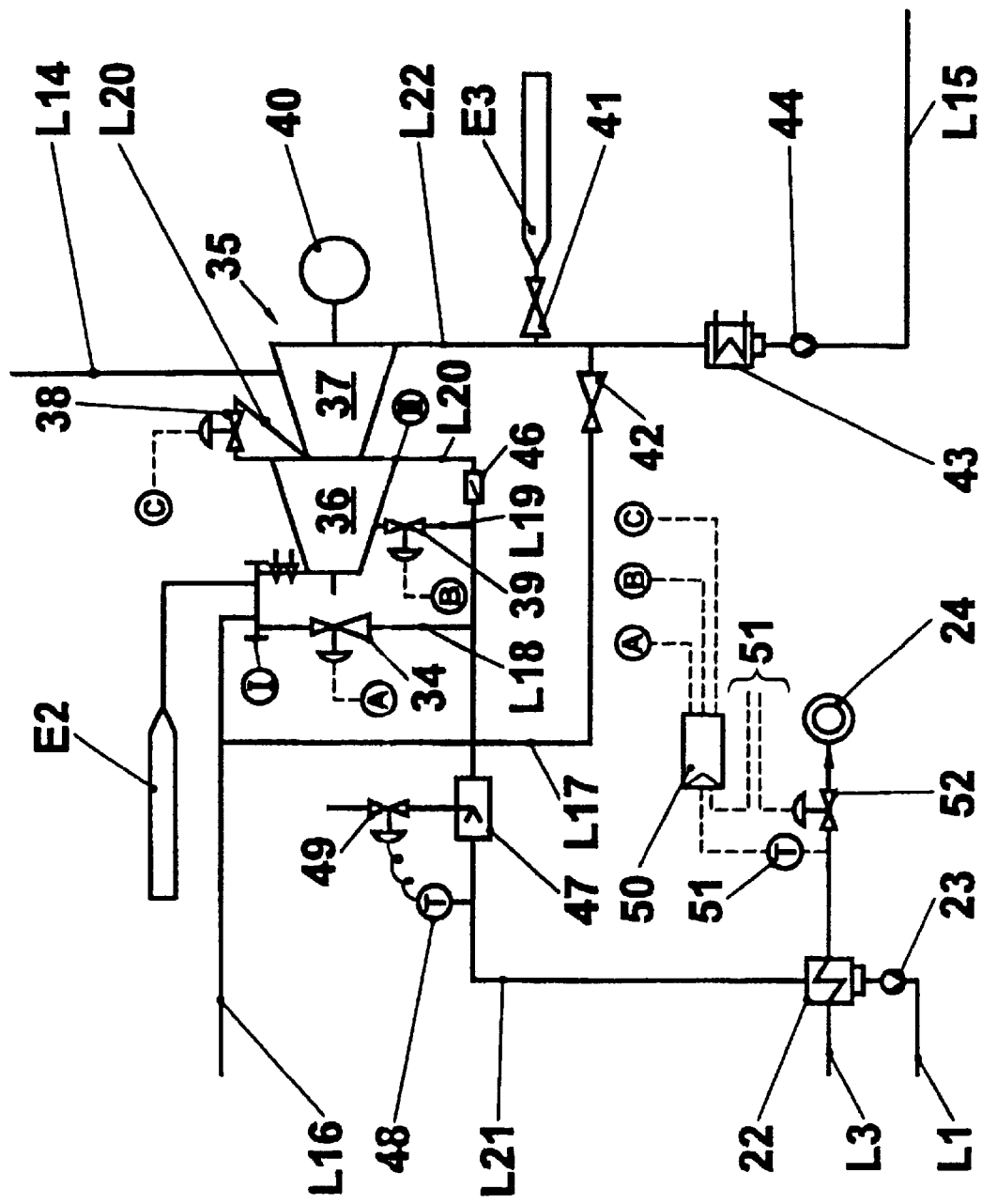
FIG. 4 shows a detail from the plan according to FIG. 3, with additional particulars of the control and regulation of heat transmission.

A preferred exemplary embodiment of a control of the valves is illustrated in FIG. 4 which shows a detail from the plan according to FIG. 3 (like elements in the two figures are provided with the same reference symbols). The three extraction points or extraction levels of the exemplary embodiment are designated in FIG. 4 by the reference symbols I (fresh steam), II (high pressure steam) and III (low pressure steam). Each of the valves 34, 39 and 38 for controlling the inlet temperature and the thermal output is connected via corresponding control lines (A, B, C) to a temperature control 50 which is connected on the input side to a temperature measuring point 51 arranged at the outlet of the condenser and which receives an input value for the process via one of two signal lines 51. The other signal line 51 controls a valve 52, by means of which the stream of heat transfer medium to the heat consumer 24 can be set. In the temperature control 50, the two input signals are compared and the valves 34, 39 and 38 are actuated via the control lines A–C, in such a way that the desired inlet temperature and thermal output are achieved optimally.

So that, when the valves 38 and 39 open simultaneously, high pressure steam cannot flow back from the extraction point II into the extraction point III for low pressure steam, it is expedient to provide a nonreturn flap 46 in the line L20. Furthermore, the temperature control can be even further improved and refined if the line L21 to the condenser 22 has arranged in it a steam temperature control device 47 which is controlled via a valve 49 by a temperature measuring point 48. In particular, fluctuations in the steam temperature can thereby be leveled out in a simple way.

For the sake of simplicity, the exemplary embodiment of FIGS. 3 and 4 shows a combination power station with only one gas turbine 16 and one waste heat steam generator 11. However, within the scope of the invention, a plurality of gas turbines and a plurality of associated waste heat steam generators may, of course, act on a common steam turbine. In that case, the other waste heat steam generators are incorporated into the water/steam circuit of the steam turbine 35 via the inlets E1, E2 and E3 (together with the pressure reducer 41) and the outlet A1, which are shown in FIGS. 3 and 4.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A combination power station with power/heat cogeneration comprising: at least one gas turbine driven by combustion gases from a combustion chamber and at least one steam turbine working in a water/steam circuit, the water/steam circuit converting water into steam in a first apparatus by hot combustion gases emerging from the at least one gas turbine and the steam being supplied to the at least one steam turbine, a separate heat transfer medium arranged in a heat exchange relationship with a heat consumer and being heated in a second apparatus by thermal energy extracted from the water/steam circuit at a plurality of extraction points each having a different temperature, and means for selectively connecting the second apparatus to the plurality of extraction points depending upon a thermal output and an inlet temperature required by the heat consumer.

2. The combination power station as claimed in claim 1, wherein the means for selectively connecting includes individual lines equipped with controllable valves for selectively connecting the second apparatus to the plurality of extraction points.

3. The combination power station as claimed in claim 2, wherein a valve control controls the controllable valves, and a temperature measuring point including a temperature measuring means is arranged at an outlet of the second apparatus in order to for determining a temperature of the heat transfer medium, and wherein a first input of the valve control is connected to the temperature measuring point.

4. The combination power station as claimed in claim 3, wherein a second input of the valve control is a desired value of the temperature of the separate heat transfer medium.

5. The combination power station as claimed in claim 1, wherein the second apparatus includes a condenser, and steam is extracted from the water/steam circuit at the extraction points, and wherein a condensate emerging from the condenser of the second apparatus is recirculated by a recirculation line into the water/steam circuit.

6. The combination power station as claimed in claim 5, wherein the plurality of extraction points includes a first extraction point for the extraction of a high pressure fresh steam, a second extraction point for the extraction of another high pressure steam and a third extraction point for a low pressure steam, and wherein a valve located at the first extraction point is a pressure reducing valve.

7. The combination power station as claimed in claim 5, wherein the second apparatus includes a preheater through which the condensate from the condenser flows, the preheater being arranged to precede the condenser and operates to preheat the separate heat transfer medium.

8. The combination power station as claimed in claim 7, wherein heated water extracted from the water/steam circuit is directed to flow through a line to the preheater.

9. The combination power station as claimed in claim 1, wherein the first apparatus includes a waste heat steam generator.

10. The combination power station as claimed in claim 9, wherein the waste heat steam generator includes an economizer, an evaporator and a superheater, and wherein water heated at the economizer is extracted from the water/steam circuit through a line in order to preheat the separate heat transfer medium.

\* \* \* \* \*